April 8, 1952   J. E. WALSH ET AL   2,591,896
GUN LOADING MECHANISM

Filed Aug. 16, 1948   11 Sheets-Sheet 1

Inventors
John E. Walsh
Chester W. Greene
By Their Attorney

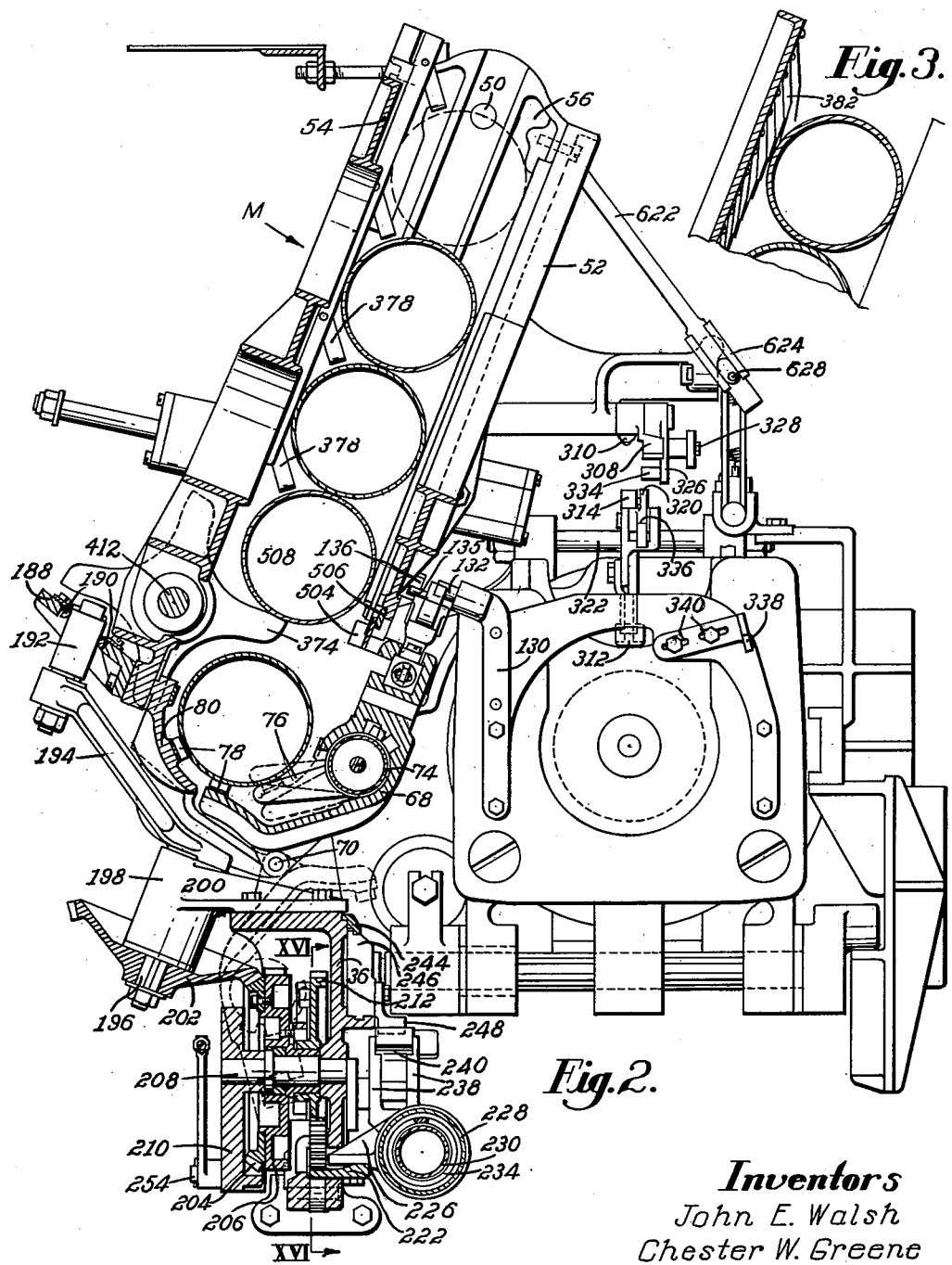

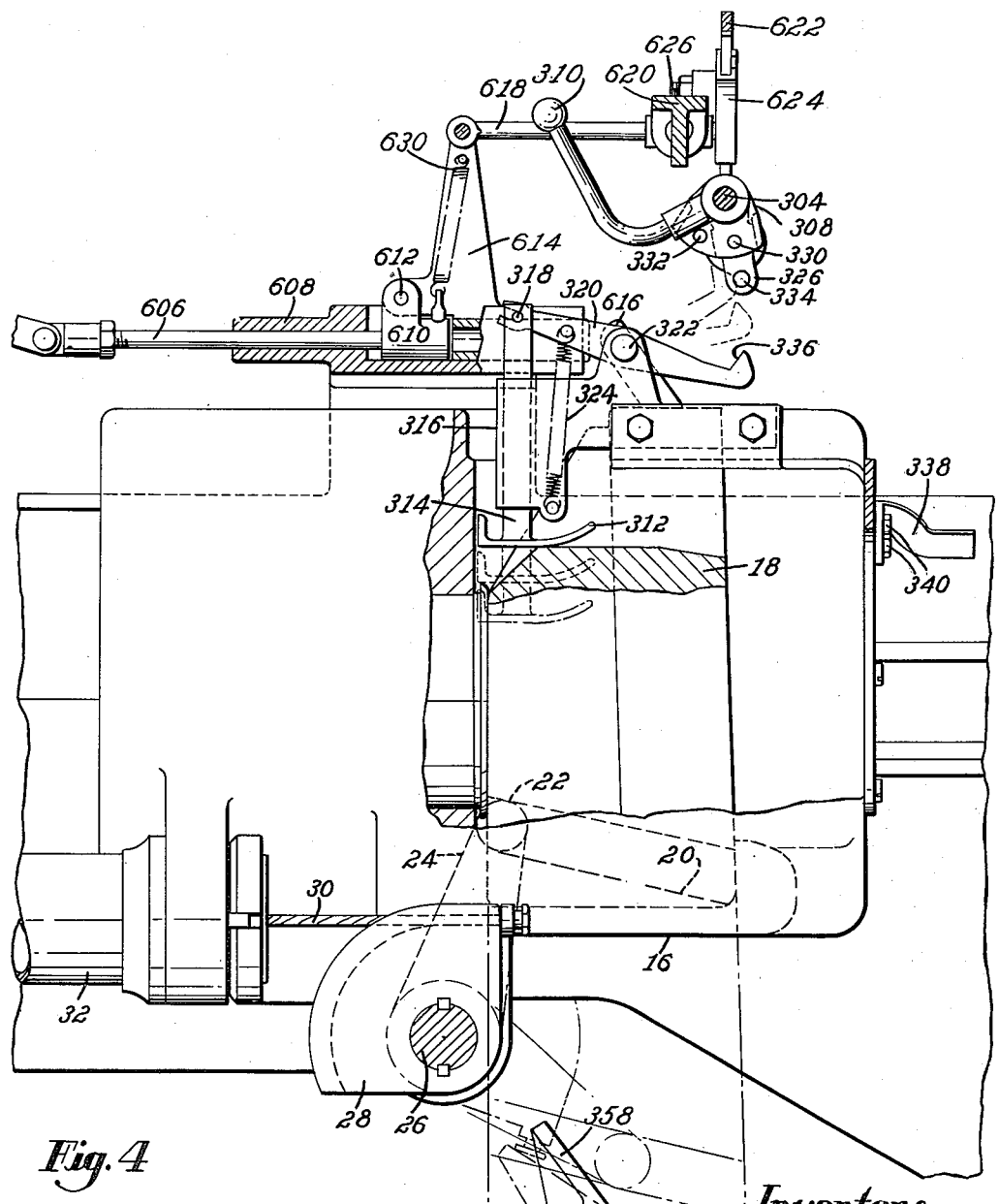

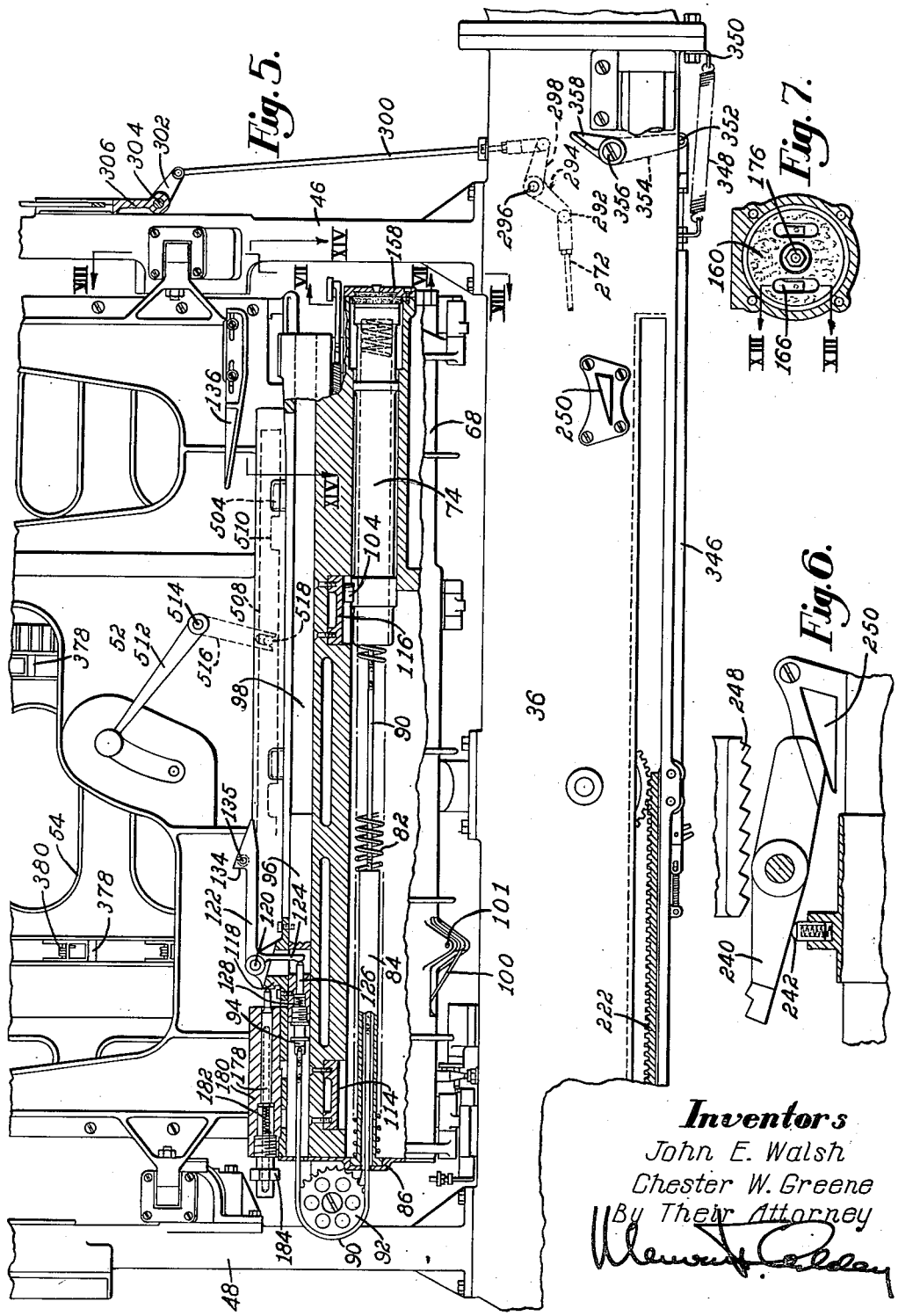

April 8, 1952     J. E. WALSH ET AL     2,591,896
GUN LOADING MECHANISM
Filed Aug. 16, 1948     11 Sheets-Sheet 5
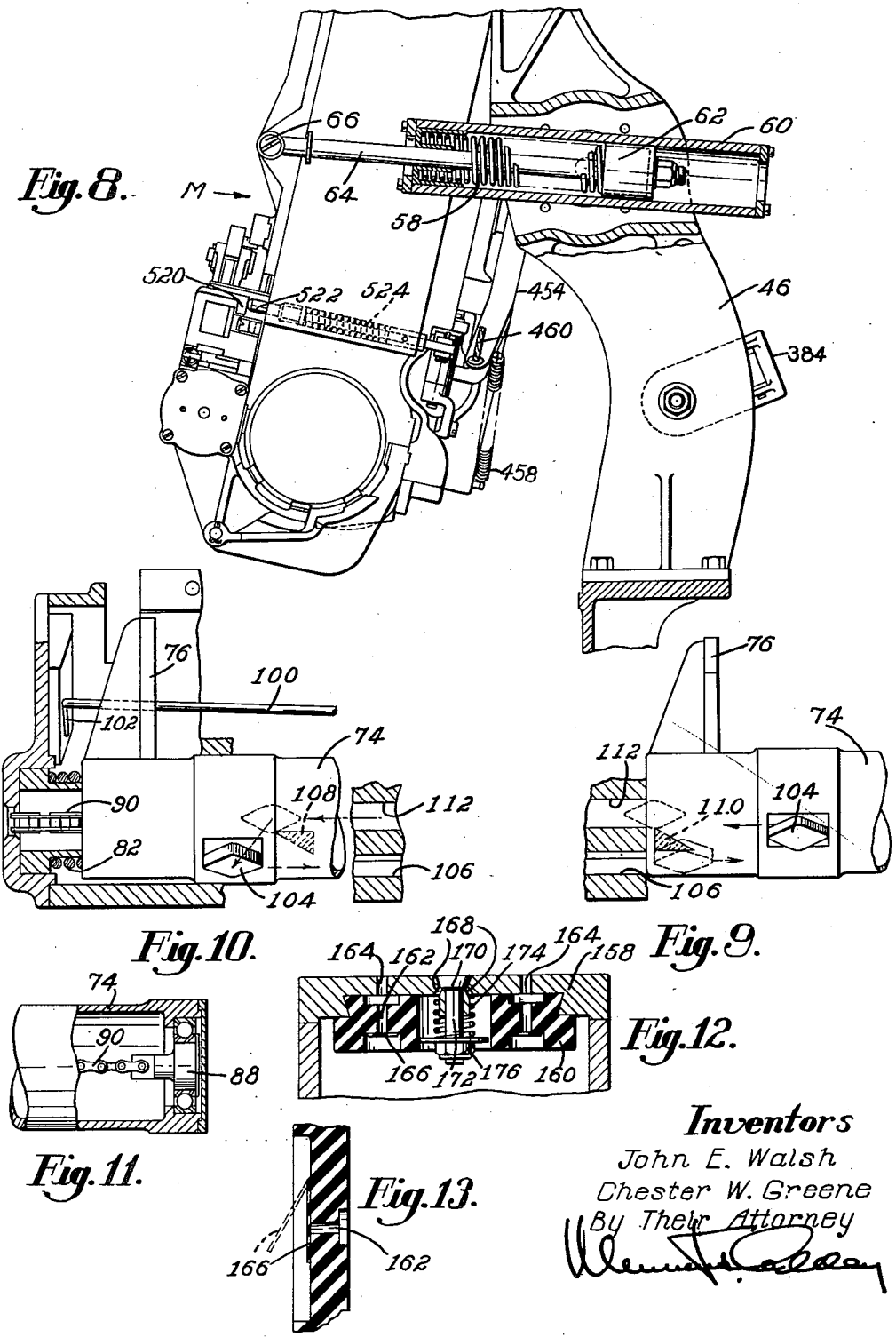
Inventors
John E. Walsh
Chester W. Greene
By Their Attorney

*Inventors*
John E. Walsh
Chester W. Greene
By Their Attorney

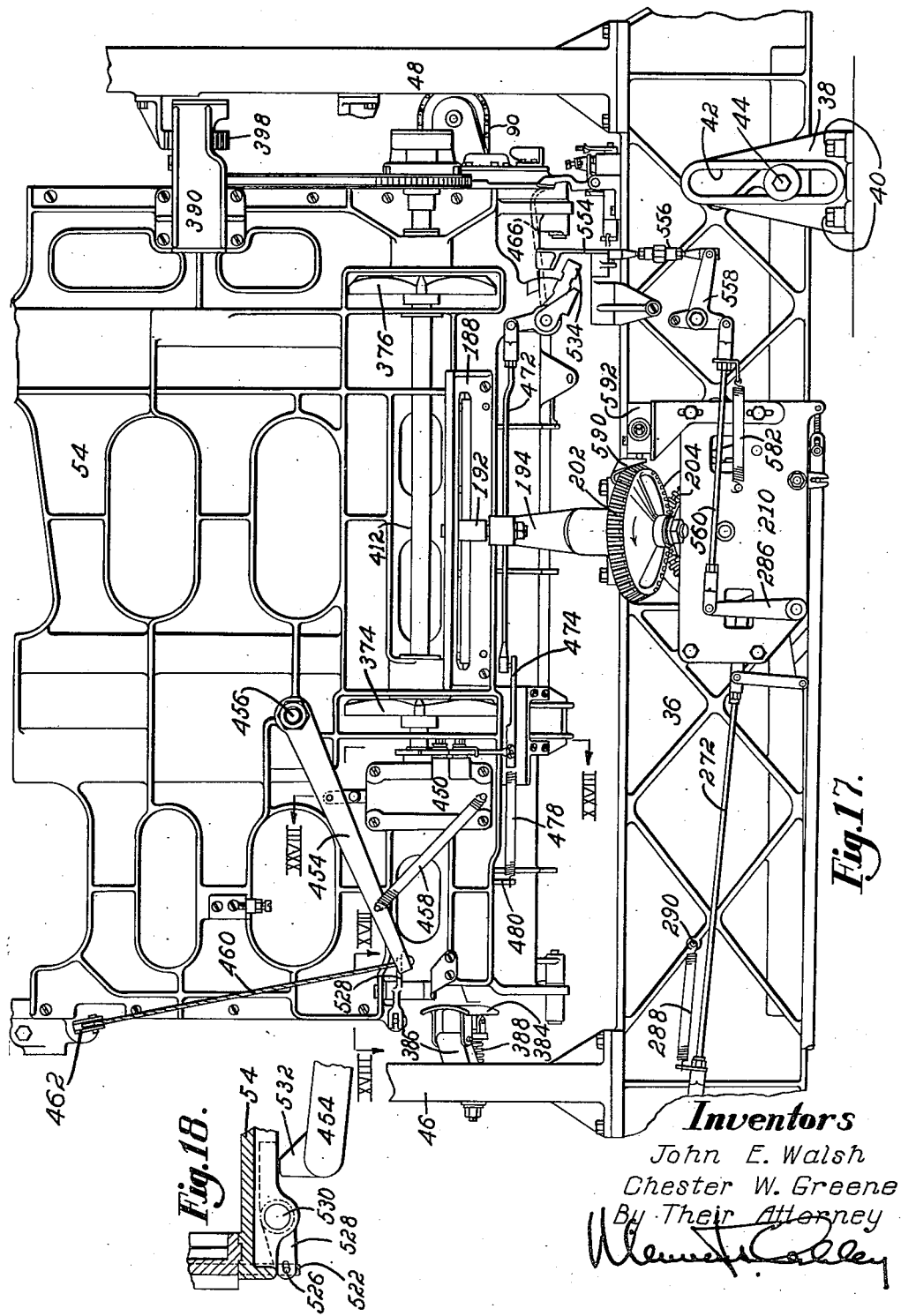

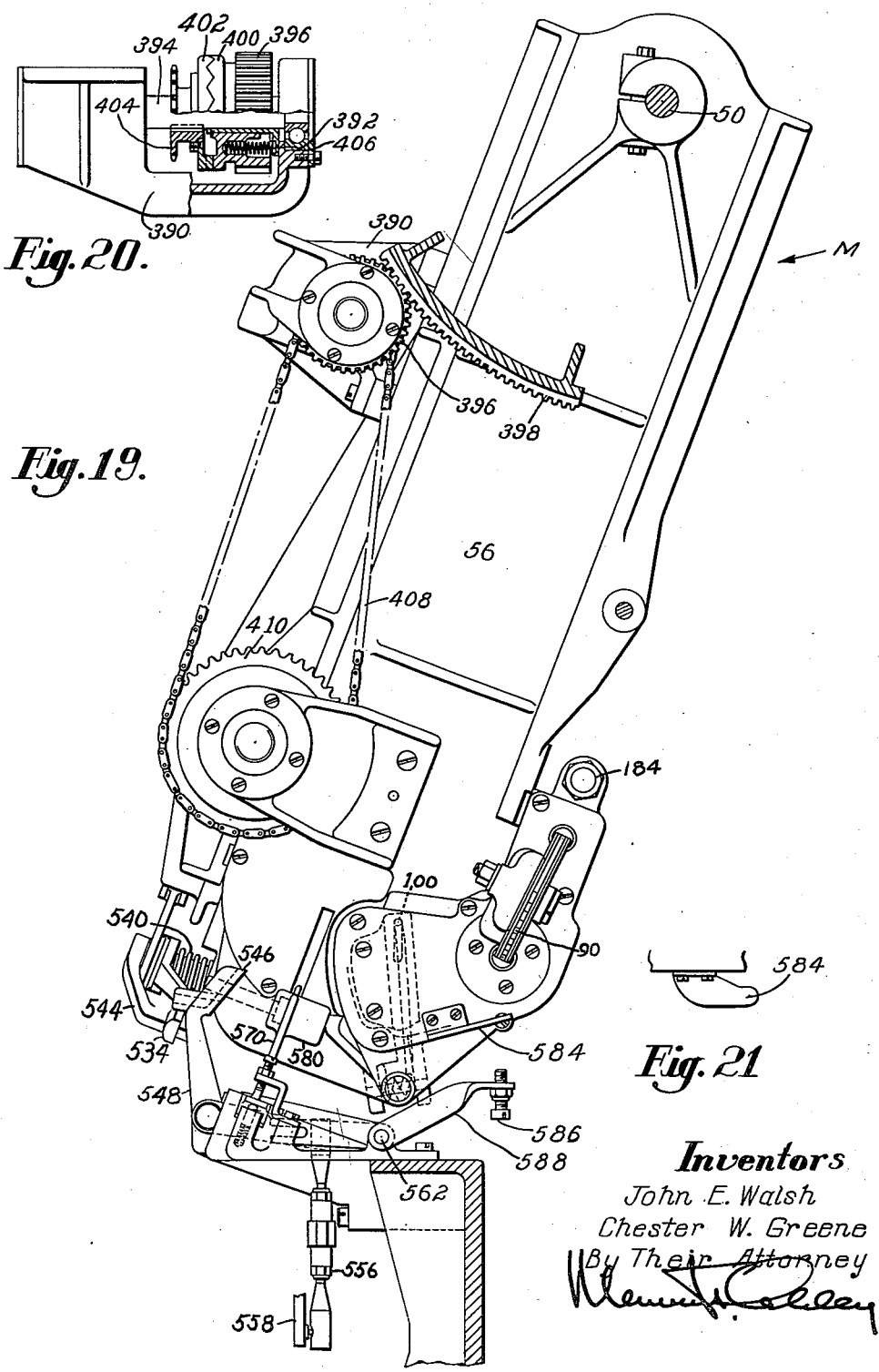

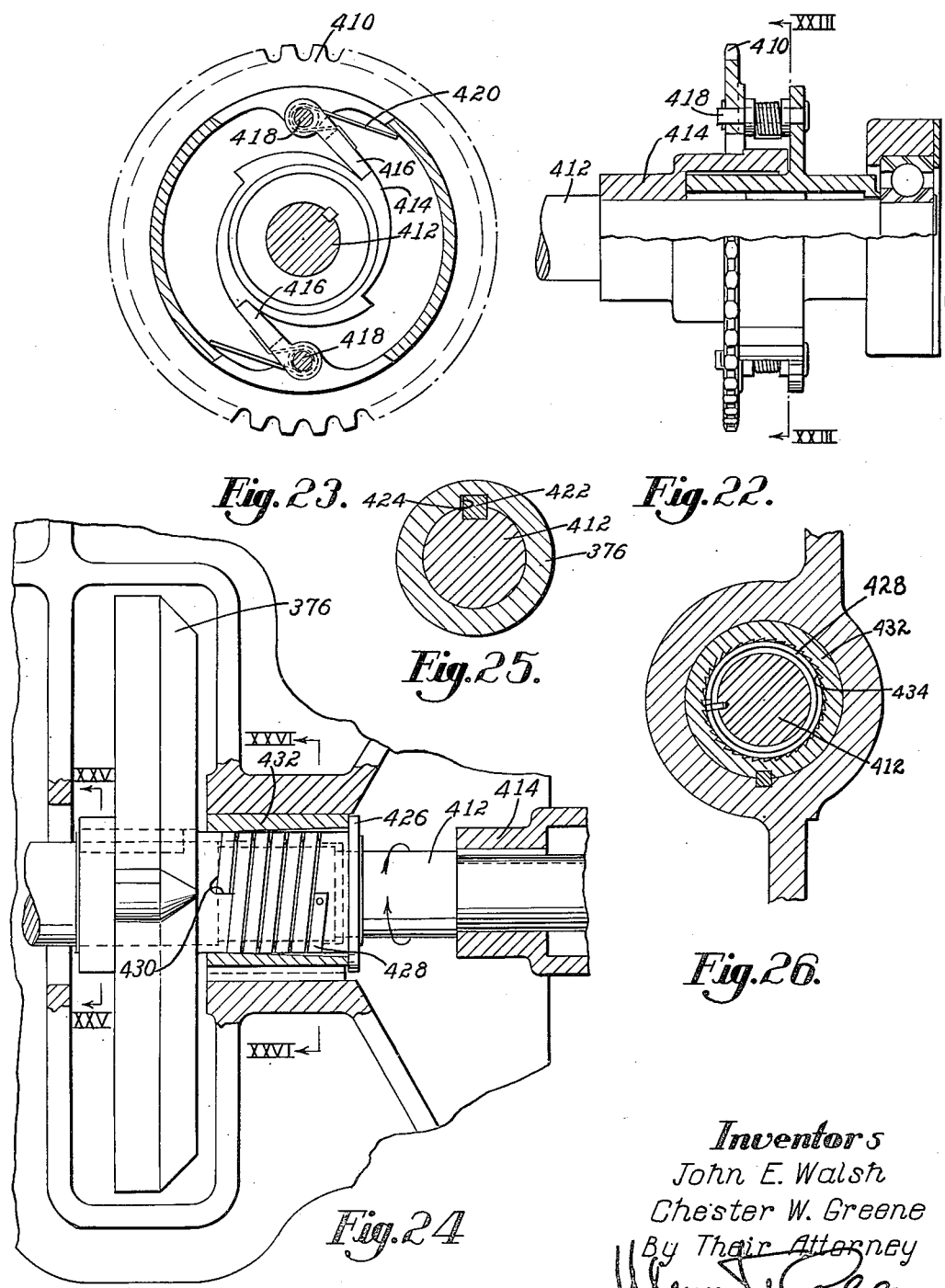

April 8, 1952  J. E. WALSH ET AL  2,591,896
GUN LOADING MECHANISM
Filed Aug. 16, 1948  11 Sheets-Sheet 10
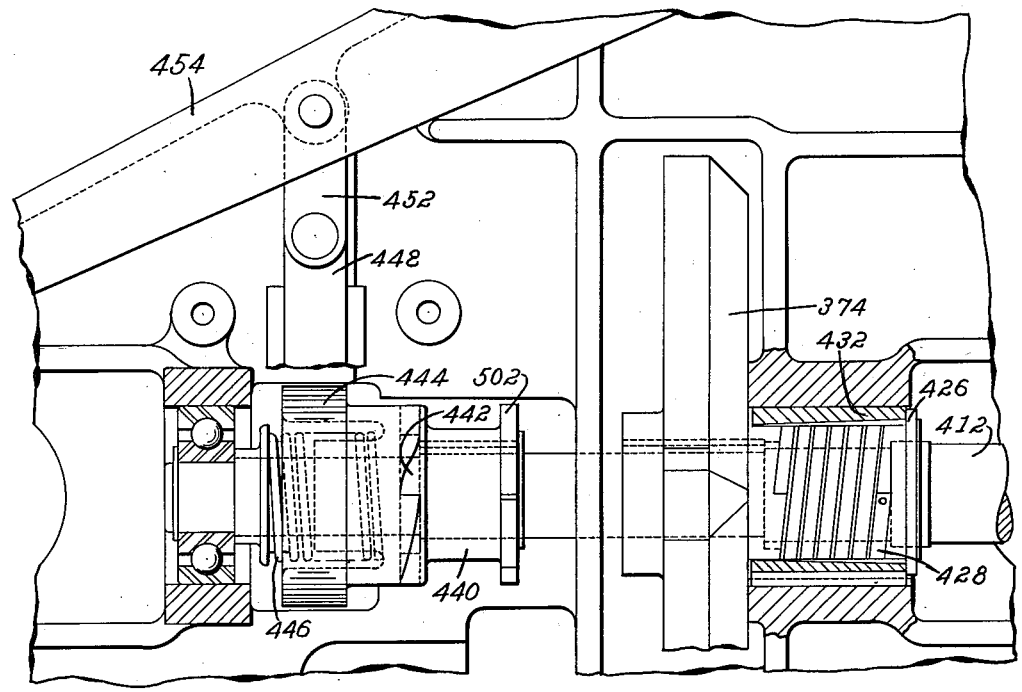
Fig. 27.
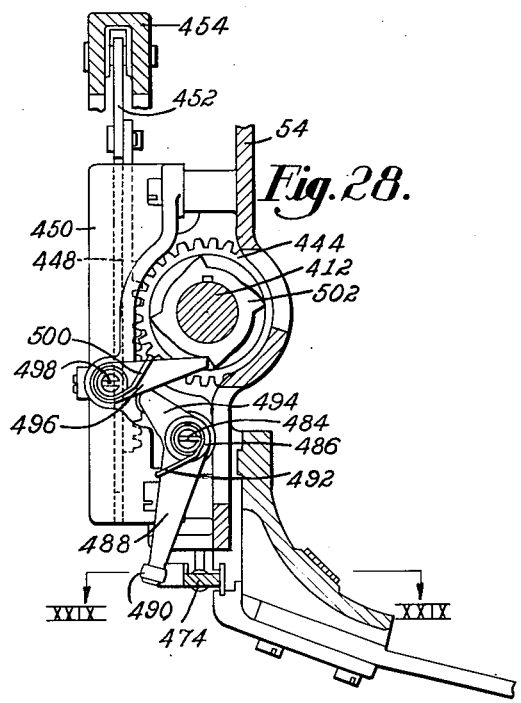
Fig. 28.
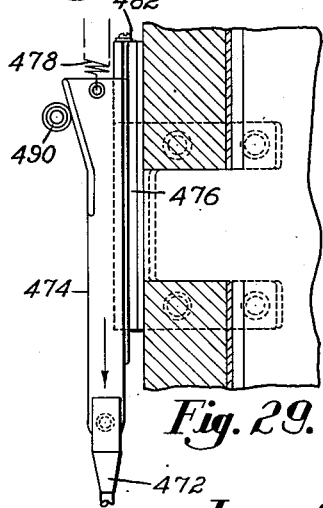
Fig. 29.
Inventors
John E. Walsh
Chester W. Greene
By Their Attorney
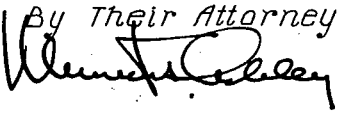

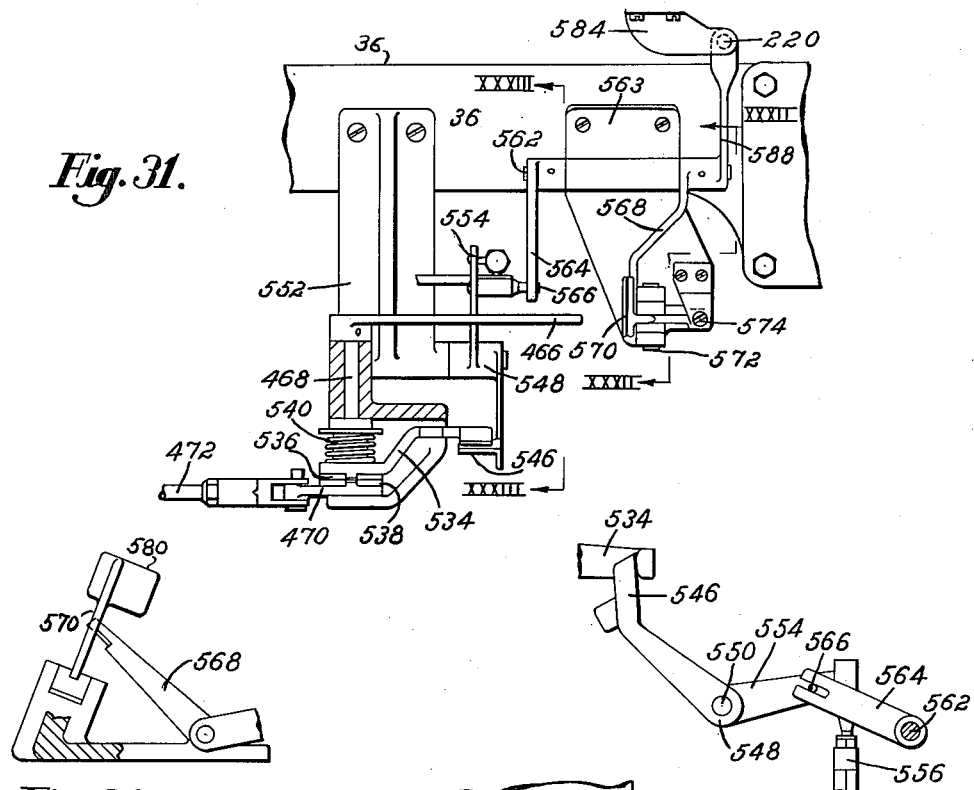

Patented Apr. 8, 1952

2,591,896

UNITED STATES PATENT OFFICE 2,591,896

GUN LOADING MECHANISM

John E. Walsh, Beverly, and Chester W. Greene, Lynn, Mass., assignors to United Shoe Machinery Corporation, Flemington, N. J., a corporation of New Jersey Application August 16, 1948, Serial No. 44,534

18 Claims. (Cl. 89—33)

This invention relates to gun-loading mechanisms, and more particularly to mechanisms for loading guns of large caliber. The invention is illustrated herein as embodied in mechanism for loading a gun adapted for use in an airplane, although it will be understood that the invention is not thus limited in its application.

An object of the invention is to provide an improved mechanism for automatically and rapidly loading shells into a gun, the energy for operating the loading mechanism being derived from the movement of the gun in counter-recoil following a firing operation. To this end and in accordance with a feature of the invention, the shells to be loaded into the gun are contained in a magazine which is movable into and out of loading relation to the gun, movement of the magazine being effected by a spring which is energized by the gun in its counter-recoil movement. Associated with the magazine is a rammer by which a shell in the lowermost portion of the magazine is moved endwise into the bore of the gun when the magazine is in its loading position, this rammer also being operated by a spring energized by the gun in its counter-recoil movement.

In accordance with a further feature of the invention, various safety interlocking mechanisms are provided for preventing malfunctioning of the apparatus in the event that conditions are not proper for the initiating of a loading cycle. Thus if a shell is not in the proper position in the magazine to be loaded into the gun, the magazine cannot be moved into its loading position, nor can it be thus moved unless the breech of the gun is clear for the reception of a shell. Following each loading operation the shells are fed downwardly by sprockets thereby to carry the lowermost shell into the ramming position in the magazine. In accordance with another feature of the invention, the sprockets are actuated in response to the movement of the magazine from its loading position into a storage position in which the magazine is out of the path of movement of the gun in recoil.

The above and other features of the invention, including various novel combinations of parts and details of construction will now be more particularly described by reference to the accompanying drawings and pointed out in the claims.

In the drawings,

Fig. 2 is a section on the line II—II of Fig. 1;

Fig. 3 is a section on the line III—III of Fig. 1;

Fig. 4 is a left side elevation partly in section of the breech end of a gun and associated mechanism;

Fig. 5 is a right side elevation partly in section of the lower portion of the shell magazine illustrating the rammer-operating mechanism;

Fig. 6 is a detail view partly in section of a portion of the mechanism by which the magazine-operating spring is cocked;

Fig. 7 is a section on the line VII—VII of Fig. 5;

Fig. 8 is a section on the line VIII—VIII of Fig. 5;

Fig. 9 is a detail view of the rammer associated with the lower portion of the magazine, the rammer being illustrated in the position it assumes when a new shell is moved onto the rammer tray;

Fig. 10 is a view similar to Fig. 9 but showing the rammer in position for the start of a ramming operation;

Fig. 11 is a sectional view of the tube in which the end of the rammer spring is received;

Fig. 12 is a sectional view of the end of the housing for the tube of Fig. 11, this view being taken on a larger scale than Fig. 11;

Fig. 13 is a section on the line XIII—XIII of Fig. 7;

Fig. 17 is a left side elevation of the loading mechanism;

Fig. 18 is a section on the line XVIII—XVIII of Fig. 17;

Fig. 19 is a rear end elevation of the loading mechanism;

Fig. 20 is a detail view partly in section of a portion of the shell feed sprocket-operating mechanism;

Fig. 21 is a plan of a member carried by the rammer tray;

Fig. 22 is a section through a portion of the shell feed sprocket-driving mechanism;

Fig. 23 is a section of the line XXIII—XXIII of Fig. 22;

Fig. 24 is a side elevation partly in section of one of the shell feed sprockets and its associated mechanism;

Fig. 25 is a section on the line XXV—XXV of Fig. 24;

Fig. 26 is a section on the line XXVI—XXVI of Fig. 24;

Fig. 27 is a side elevation partly in section of one of the feed sprockets and mechanism associated therewith by which the sprockets are operated manually;

Fig. 28 is a section on the line XXVIII—XXVIII of Fig. 17;

Fig. 29 is a section on the line XXIX—XXIX of Fig. 28;

Fig. 30 is an end elevation of a portion of the interlock mechanism by which malfunctioning of the apparatus is prevented;

Fig. 31 is a section on the line XXXI—XXXI of Fig. 30;

Fig. 32 is a section on the line XXXII—XXXII of Fig. 31; and

Fig. 33 is a section on the line XXXIII—XXXIII of Fig. 31.

Figure 1:
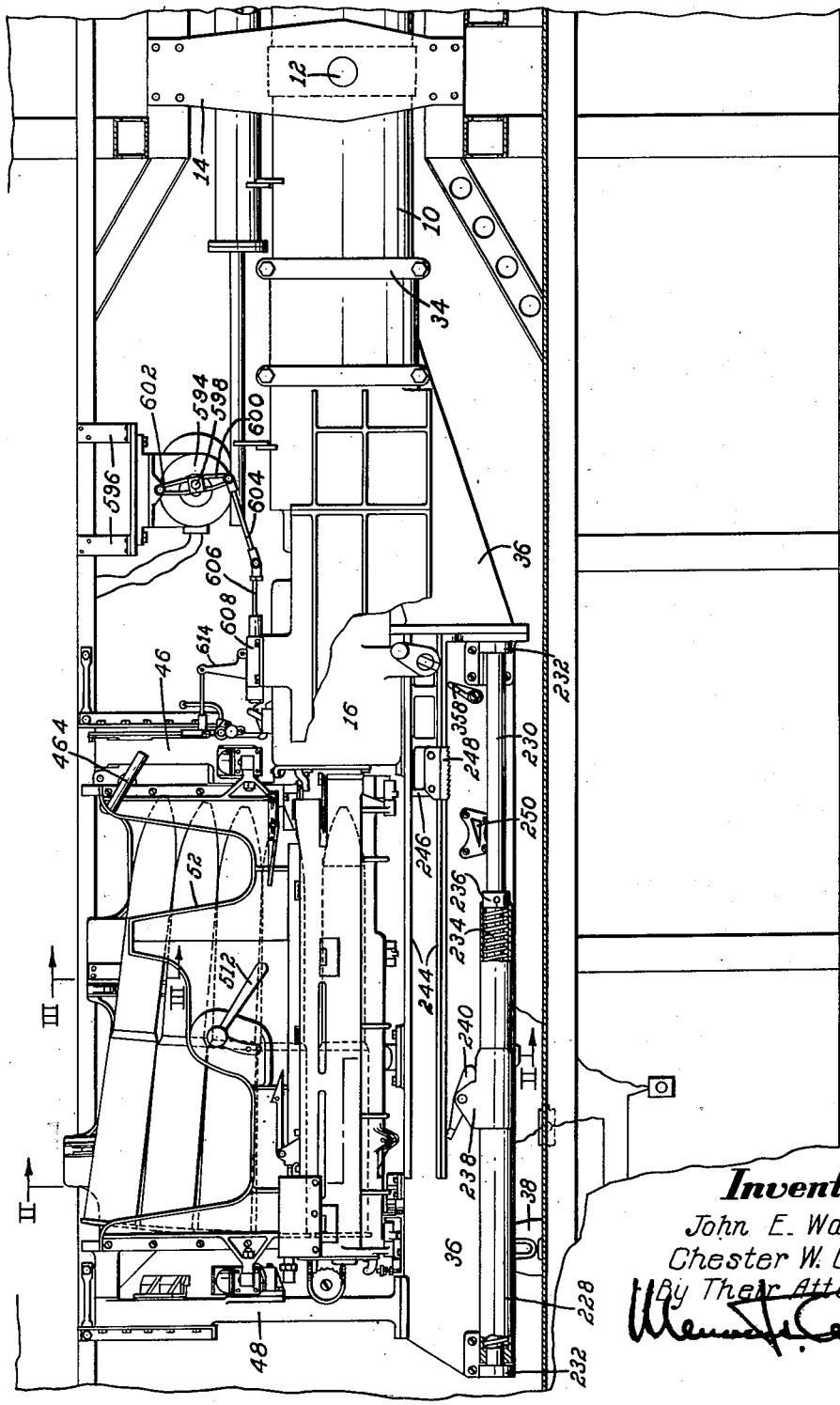
Fig. 1 is a right side elevation of one form of gun-loading mechanism in which the invention is embodied.

The invention is illustrated herein as embodied in a loading mechanism for a gun of large caliber such as a 75 mm. gun. The gun is supported in a carriage 10 (Fig. 1) carrying trunnions 12 journaled in vertical plates 14 secured within the interior of an airplane in which the gun is mounted. The breech housing of the gun is illustrated at 16 and, as shown in Fig. 4, the gun is of the vertical sliding breechblock type of well known construction. A breechblock 18 is slidable in the breech housing 16 and includes a cam track 20 receiving a cam roll 22 at the outer end of an arm 24 secured to a shaft 26 extending transversely of the gun in the lower portion of the breech housing. This shaft carries an arm 28 to which is secured one end of a cable 30 the other end of which is secured to a spring (not shown) in a housing 32. During counter-recoil movement of the gun the breechblock 18 is moved downwardly in a well-known manner and after a new shell has been loaded in the gun the spring in the housing 32 is effective to move the shaft 26 in a counterclockwise direction whereupon the breechblock 18 is moved upwardly to force the shell forwardly in the breech.

Secured to the carriage 10 by clamps 34 (Fig. 1) is a downwardly and rearwardly extending supporting beam 36 (Figs. 1 and 17) by which the loading mechanism is carried. This supporting beam with the gun carriage 10 is secured in a fixed position with respect to the airplane, the gun being intended to be directed at the target by properly positioning the airplane with respect to the target. For thus securing the gun carriage and supporting beam, a bracket 38 is secured at 40 to the airplane, this bracket having a vertical slot 42 through which passes a screw 44 threaded into an adjacent portion of the beam 36. By loosening the screw 44 the beam 36 may be moved vertically through a slight angle and after the gun is properly positioned in the airplane the screw is tightened to clamp the supporting beam to the bracket 38.

Extending upwardly from the supporting beam 36 are forward and rearward magazine supports 46, 48 in the upper ends of which are journaled pins 50 (Figs. 2 and 19) for a shell magazine M. This magazine includes right and left hand walls 52, 54 which are connected by end walls 56 from which the pins 50 project and by which the magazine is carried by the supports 46, 48 for swinging movement laterally of the gun from a storage position, as shown in Fig. 2 into a loading position in which a shell in the lower portion of the magazine is alined with the bore of the gun, whereupon it is rammed into the gun by mechanism to be described and the magazine then returned into the position shown in Fig. 2, in which it is out of the path of the gun in its recoil movement. The movements of the magazine into and out of loading position with respect to the gun are effected by mechanism operated by a spring which is energized during the counter-recoil movement of the gun as will be explained. During movement of the magazine into loading position a pair of springs, one of which is indicated at 58 (Fig. 8) is compressed, these springs assisting the aforementioned spring in returning the magazine into the storage position of Fig. 2. These springs are contained in housings 60 which are journaled in the supporting arms 46, 48, one end of each of the springs engaging a piston 62 movable in the housings and carrying rods 64 pivoted at 66 to the end walls of the magazine. With the magazine in ramming position, as shown in Fig. 8, the springs 58 have been compressed between the pistons 62 and the ends of the housings 60 and thus act as buffers in the movement of the magazine into its loading position. The energy stored in the springs 58 partially augments that which has been dissipated in the magazine-moving spring and assists the latter in returning the magazine into storage position.

The lower portion of the side wall 52 of the magazine (Fig. 2) is cut away to permit egress of shells laterally from the magazine when desired, but the opening thus formed is normally closed by a rammer tray 68 pivoted at 70 in the lower portion of the magazine. The tray 68 has a bore therein for a ramming tube 74 having a laterally extending ramming finger 76 arranged when in the upper broken line position of Fig. 2 to engage the rear end of a shell and upon forward movement of the ramming tube 74, by means to be described, to move the shell forwardly into the breech end of the gun. The shell is supported in ramming position by spring members 78 carried by the tray 68 and a curved wall 80 secured to the lower end of the left hand wall 54 of the magazine. The ramming tube 74 is moved forwardly by a spring 82 (Fig. 5) engageable with the forward closed end of the tube 74 and with the flanged end of a smaller tube 84 carried by a plate 86 at the end of the tray 68. Journaled in the closed end of the rammer tube 74 is a swivel 88 (Fig. 11) to which is connected one end of a sprocket chain 90 which passes over a sprocket 92 (Fig. 5), the other end of the chain being connected to a retaining member 94 threaded into the adjacent end of a slide 96. This slide is movable in a way 98 formed in the tray 68 and when the slide is moved forwardly or toward the right, as viewed in Fig. 5, it will be apparent that the rammer tube 74 is moved rearwardly compressing the spring 82, thereby to move the ramming finger 76 (Fig. 2) rearwardly of a shell in the ramming position. The swivel 88 is provided between the tube 74 and the chain 90 so that the tube can turn during its rearward movement, enabling the ramming finger 76 to be moved from the lower broken line position of Fig. 2 into the upper broken line position when the finger is located rearwardly of the shell. For thus turning the tube 74 during this rearward movement a spring 100 is connected by a pin 101 (Fig. 5) to the tray 68 and extends upwardly and rearwardly through the tray (Fig. 10) into position to be engaged by the ramming finger 76 causing the finger to be carried upwardly after it has cleared the flange at the rear end of the shell. The rearward end of the spring 100 is guided in a slot 102 which permits the spring to be bent downwardly and stressed during the rearward movement of the ramming tube. The force built up in the spring 100 acts to turn the tube and move the ramming finger into operative position with respect to the shell at the completion of the rearward movement of the tube 74. The rammer tube carries a diamond shaped positioning member 104 which moves in a slot 106 in the adjacent portion of the tray 68 during the ramming operation or when the tube is moved toward the right as viewed in Fig. 10. A stationary cam member 108 cooperates with the positioning member 104 to guide it into the slot 106 and maintain the ramming finger 76 in the proper relationship to the shell during the ramming operation. At the forward end of the slot 106 is a second stationary cam member 110. Upon movement of a new shell downwardly in the magazine into ramming position with the ramming finger 76 in its forward position, engagement of the finger by the shell will turn the finger and the rammer tube into the position shown in Fig. 9, with the ramming finger in the full line position of Fig. 2. Upon rearward movement of the rammer tube the positioning member cooperates with the stationary cam 110 to guide the member into a slot 112 in which the ramming finger assumes the lowermost position indicated in Fig. 2. The stationary cams 108, 110 are carried by inserts 114, 116 (Fig. 5) secured to the tray 68.

Secured to the slide 96 is a hollow bracket 118 in the upper end of which is pivoted at 120 a forwardly extending latch 122. This latch has a depending arm 124 the lower end of which is engaged by a pin 126 urged forwardly by a spring 128 thereby normally to hold the forward end of the latch in the position shown in Fig. 5 but permitting this end of the latch to be depressed. Secured to the rear wall of the breech housing is an upwardly extending arm 130 (Fig. 2) carrying a laterally extending pin 132. During movement of the gun in counter-recoil the pin 132 engages a shoulder 134 on the latch 122 moving the latch and the slide 96 forwardly along the slideway 98, thus causing the rammer tube 74 to be moved rearwardly compressing the spring 82. During the latter part of the movement of the gun toward battery position a pin 135 extending laterally from the latch 122 engages the undersurface of a cam plate 136 secured to the adjacent wall of the magazine whereupon the latch is moved downwardly and out of engagement with the pin 132 movable with the gun. Thus the gun is disconnected from the latch during the final portion of the movement of the gun to battery.

Figure 14:
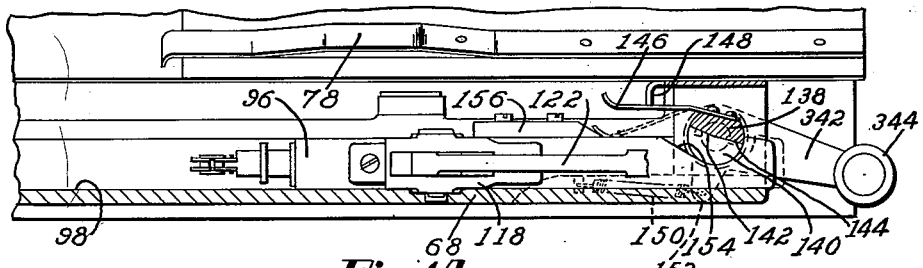
Fig. 14 is a section on the line XIV—XIV of Fig. 5.

For holding the slide 96 in its forwardmost position until the next ramming operation is to be initiated, mechanism shown in Fig. 14 is provided. Pivoted at the forward end of the guideway 98 is a pin 138 having a cut-away portion 140. This cut-away portion forms a pair of flat surfaces 142, 144 which are at a slight angle to each other. Secured to the pin 138 is a rearwardly extending leaf spring 146 which cooperates with an abutment 148 to limit clockwise movement of the pin, as shown in Fig. 14. The pin is urged in a clockwise direction by a spring 150 acting between a pin secured to the tray 68 and an arm 152 extending laterally from the pin 138. The forward end of the slide 96 has formed therein a recess 154 provided at its forward end with a shoulder which cooperates with the pin 138 after the slide has moved into the position shown in Fig. 14, to prevent rearward movement thereof under the force exerted by the spring 82 (Fig. 5). During forward movement of the slide the surface 144 of the pin 138 is engaged by the forward end of the slide, causing the pin to move in a counterclockwise direction against the action of the spring 150 after which the pin returns into the position shown in Fig. 14. Actually the slide will move forwardly of the position shown, into the broken line position at which time a cam plate 156 carried by the slide 96 will engage the rear portion of the spring 146 to insure that the pin 138 will be moved into locking position with respect to the slide before the slide has an opportunity to move rearwardly far enough to clear the adjacent portion of the pin 138. Thus it will be seen that upon forward movement of the slide and downward movement of the latch 122 out of operative relation to the pin 132 carried by the breech housing, the pin 138 becomes operative to lock the slide in its forwardmost position holding the rammer in cocked position in readiness for a subsequent loading operation.

The forward end of the tray 68 in which the rammer tube 74 slides forms a dash pot 158 (Figs. 5 and 12) to slow down the movement of the rammer tube during the latter portion of its ramming movement. Carried in the end wall of the dash pot is an annulus 160 of rubber provided with openings 162 which cooperate with ports 164 in the end wall. Rubber flaps 166 (Fig. 13) permit admission of air into the dash pot when the tube 74 is moved rearwardly but act as check valves and close by the pressure of air against them when the tube 74 is moved forwardly in the ramming operation whereupon the air ahead of the tube in the dash pot is compressed. In the final portion of the forward movement of the tube 74 the air is permitted to escape from the dash pot through ports 168 (Fig. 12) formed in the end wall of the dash pot. These ports are normally closed by a valve 170 having a rearwardly extending valve stem 172 surrounded by a spring 174 which acts between the end wall of the dash pot and a washer retained by a nut 176 on the end of the valve stem. When the rammer tube 74 approaches the end of its forward movement it engages the adjacent end of the valve stem 172 and opens the valve against the action of the spring 174 to permit the escape of the excess air in the dash pot. A buffer is also provided for the slide 96 upon its rearward movement into the position shown in Fig. 5. This buffer consists of a pin 178 movable in a housing 180 and urged forwardly by a spring 182 into a position to be engaged by the latch supporting bracket 118. The effectiveness of the spring 182 is controlled by an adjustable abutment 184.

For moving the magazine between stored and loading positions, mechanism shown in Figs. 1, 2 and 17 is provided. As shown in Figs. 2 and 17, a plate 188 is fastened to the lower portion of the side wall 54 of the magazine and extends laterally thereof. This plate has a slot extending lengthwise of the magazine, the edges of the slot being formed of hardened steel strips 190 between which is received a roll 192 journaled at the outer end of an arm 194 secured to a shaft 196. This shaft is journaled in a bearing 198 formed in the outer end of a plate 200 secured to the top of the supporting beam 36. When the shaft 196 is rotated 180° motion is imparted through arm 194 and roll 192 to the magazine moving it into loading position in which the shell in the bottom of the magazine is alined with the bore of the gun. The magazine pauses in this position long enough for a shell to be rammed into the gun after which the shaft 196 is turned another 180°, returning the parts to the positions shown in Fig. 1, with the magazine in stored position and out of the path of movement of the gun in recoil.

Secured to the lower end of the shaft 196 is a bevel gear 202 in engagement with a bevel gear 204 secured to a cam 206 (Figs. 2 and 15) which is journaled on a shaft 208 carried at one end by the supporting beam 36 and at its other end by a plate 210 secured to the beam in spaced relation thereto and forming therewith a gear housing. The cam 206 has a laterally extending hub portion on which is journaled a pinion 212 pivoted to which is a pawl 214 (Fig. 16) urged by a spring-pressed plunger 216 into engagement with the periphery of a cam 218 which is secured to the cam 206. It will be obvious from an inspection of Fig. 16 that upon movement of the pinion 212 in a clockwise direction the pawl 214 will ride over the surface of the cam 218 and impart no movement thereto. However, upon counterclockwise movement of the pinion 212 the pawl 214 engages a shoulder 220 on the cam 218 moving the cam with the pinion so that similar movement is imparted to the cam 206 and the bevel gear 204, which as heretofore explained, causes movement of the magazine. Thus it will be understood that when the pinion 212 is rotated in a counterclockwise direction as viewed in Fig. 16 the magazine is moved into loading position and upon further movement of the pinion 212 the magazine is returned into the position shown in Fig. 2.

For imparting movement to the pinion 212 a rack 222 moves in a slideway formed in the lower portion of the supporting beam 36 and is held by rolls 224 in engagement with the pinion. This rack is carried by an arm 226 extending laterally from a tube 228 which is slidable along a smaller tube 230 (Figs. 1 and 2) which is carried at its ends by brackets 232 secured to the supporting beam 36. The rearward end of the tube 228 is closed and forms an abutment for one end of a spring 234, the other end of which engages a collar 236 secured to the tube 230. The tube 228 carries a pair of upstanding spaced arms 238 between which is pivoted a pawl 240 the rearward end of which is urged upwardly by a spring-pressed plunger 242 (Fig. 6).

Slidable in tracks 244 along the supporting beam 36 is a slide 246 the forward end of which is secured to the breech housing of the gun. This slide carries a ratchet bar 248 which is arranged in response to movement of the gun in recoil to move into engagement with the rearward end of the pawl 240 so that upon return of the gun to battery the pawl moves with the ratchet bar 248 carrying the tube 228 forwardly compressing the spring 234. During this movement the rack 222 moves with the tube 228 turning the pinion 212 (Fig. 16) in a clockwise direction during which movement no motion is imparted to the magazine as heretofore explained. The supporting beam 36 carries a stationary cam 250 in position to be engaged by the forward end of the pawl 240, as shown in Fig. 6, causing movement of the pawl in a counterclockwise direction whereupon its rearward end moves out of engagement with the ratchet 248. Thus the tube 228 is disconnected from the gun during the final portion of movement of the gun to battery.

Return movement of the tube 228 under the action of the spring 234 to the position shown in Fig. 1 is prevented until the proper time in the cycle of operations by a stop 252 (Fig. 15) pivoted at 254 between the plate 210 and the supporting beam 36. The cam 206 has a slotted portion 256 containing a pawl 258 journaled on the shaft 208. A spring 260 in the cam 206 urges the pawl 258 in a counterclockwise direction relatively to the cam. With the parts in the positions illustrated in Fig. 15, the pawl 258 is in engagement with the stop 252 preventing movement of the cam 206 in a counterclockwise direction. However, upon movement of the stop 252 out of engagement with the pawl 258 the spring 234 operates as heretofore explained to move the pinion 212 in a counterclockwise direction until the pawl 258 moves into engagement with a stop 262 journaled at 264 between the plate 210 and the supporting beam 36 at the side of the cam 206 opposite the stop 252. Consequently the motion of the cam 206 is arrested after a movement of 180° during which the magazine has been moved from battery position into loading position with respect to the gun. Upon movement of the stop 262 out of engagement with the pawl 258 by mechanism to be described, the cam 206 is permitted to move back to the position shown in Fig. 15 thereby causing movement of the magazine back to storage position.

Figure 15:
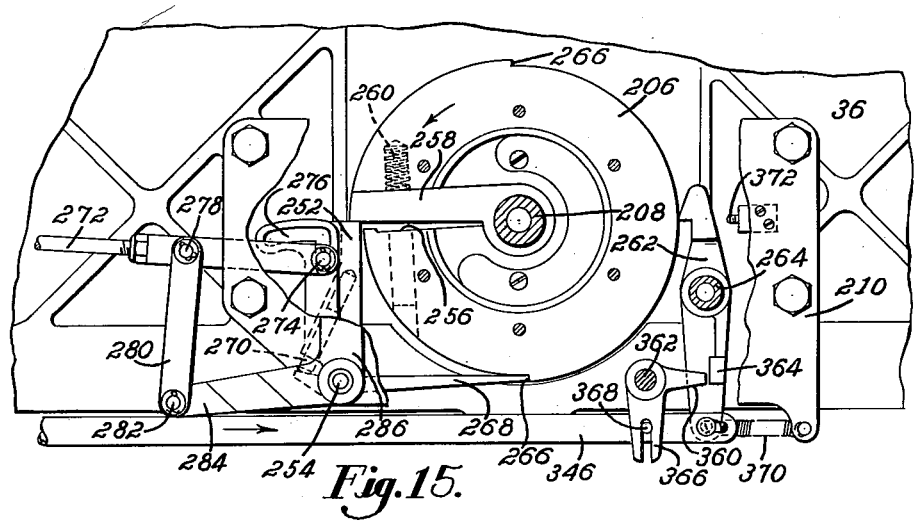
Fig. 15 is a side elevation of a portion of the mechanism for controlling the movements of the magazine.
Figure 16:
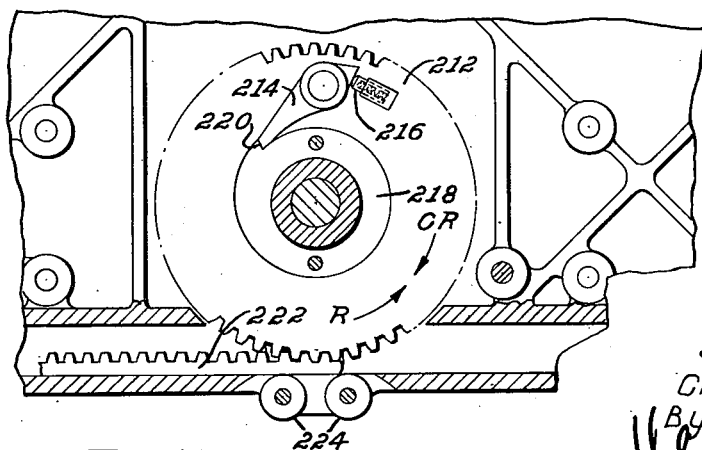
Fig. 16 is a section on the line XVI—XVI of Fig. 2.

The periphery of the cam 206 is provided with a pair of shoulders 266 spaced 180° apart with which cooperates a pawl 268 journaled at 254 and held by a spring-pressed plunger 270 in engagement with the periphery of the cam. This pawl cooperates with the shoulders 266 to prevent retrograde movement of the cam 206. The spring 260 which backs up the pawl 258 absorbs the shock when the cam and the associated mechanism is brought to rest by the stops 252, 262. It will be understood from the above description that upon movement of the gun in counter-recoil the sleeve 228 (Fig. 1) is moved forwardly compressing the spring 234 and moving the rack 222 (Figs. 5 and 16) forwardly with the tube. This movement of the tube and rack takes place without imparting any movement of the magazine and the parts are held by the stop 252 in the positions in which they are moved by the gun in its return to battery. However, as soon as the stop 252 (Fig. 15) is withdrawn, the spring 234 is effective to move the rack 222 to the right as shown in Fig. 16 causing the magazine to move into loading position in which position the magazine is brought to rest by the stop 262 but when this stop is subsequently withdrawn the parts are returned to the positions illustrated in Figs. 2 and 15 by the spring 234.

For moving the stop 252 out of engagement with the pawl 258 to permit movement of the magazine into loading position a link 272 (Fig. 15) has a pin 274 at one end thereof received in a slot 276 in the upper end of a member integral with the stop. This slot has a vertical portion and a generally horizontal portion, the arrangement being such that if the pin 274 is in the vertical portion of the slot as illustrated and the link is moved to the left the stop is moved out of engagement with the pawl. However, if the pin 274 is in the upper horizontal portion of the slot and the link moved to the left no motion is imparted to the stop. The link is thus positioned when conditions are not proper for movement of the magazine into loading position as will be explained. The link is pivoted at 278 to a vertical link 280 which is in turn pivoted at 282 to an arm 284 of a bell crank lever 286 secured to the shaft 254. When the bell crank lever 286 is moved in a clockwise direction as will be explained the pin 274 is moved into the upper portion of the slot 276 and the link 272 then becomes ineffective to operate the stop 252. The link 272 is urged to the right as viewed in Fig. 15 by a spring 288 (Fig. 17) connected between the link and a pin 290 in the supporting beam 36.

The forward end of the link 272 is pivoted at 292 (Fig. 5) to an arm 294 of a bell crank lever pivoted at 296 to the supporting beam 36. The other arm 298 of the bell crank lever is connected by an upwardly extending link 300 to an arm 302 fast on a shaft 304 journaled in a bracket 306 carried by the support 46. This shaft extends horizontally to a position above the breech end of the gun and has secured to it an arm 308 provided with a handle 310 (Figs. 2 and 4). If the shaft 304 is moved in a clockwise direction as viewed in Fig. 4 by the handle 310 the bell crank lever 294, 298 (Fig. 5) is moved in a clockwise direction moving the link 272 forwardly and withdrawing the stop 252 from engagement with the pawl 258 (Fig. 15). In the event that it is desired to operate the gun in rapid fire, the shaft 304 (Fig. 4) is operated automatically in response to return of the gun to battery with the breechblock open and the previously fired shell case being extracted from the gun. As shown in Fig. 4, a vertically movable feeler 312 is provided for engagement with a top surface of the breechblock. This feeler has a vertical shank portion 314 slidable in a bracket 316 secured to the breech housing of the gun, the upper end of the shank having a pin and slot connection 318 with a lever 320 pivoted at 322 to the bracket 316. A spring 324 acting between the lever 320 and the bracket 316 urges the lever in a counterclockwise direction and consequently urges the feeler 312 downwardly. When the gun is fired the breechblock opens at the proper time in the counter-recoil movement whereupon the feeler 312 drops into the intermediate position shown in Fig. 4 in contact with the rim of the shell case. If the empty shell case is extracted from the gun the feeler will then drop into the lowermost position shown in Fig. 4 moving the rearward end of the lever 320 into the uppermost broken line position. Journaled on the shaft 304 is an arm 326 (Figs. 2 and 4) carrying a pin 328 arranged to enter either of a pair of holes 330, 332 in the arm 308, thereby to connect the arm 326 to the arm 308 in either of two predetermined positions. Carried by and extending laterally from the lower end of the arm 326 is a pin 334 which when the arm 326 is in the position shown in Fig. 4 is in the path of movement of an upwardly projecting end 336 of the lever 320 when this end of the lever occupies the uppermost position which will happen only with the breechblock open and the gun cleared of the previously fired shell case. Accordingly upon return of the gun into battery position engagement of the pin 334 by the upwardly projecting end 336 of the lever 320 will rock the shaft 304 in a clockwise direction thereby to withdraw the stop 252 (Fig. 15) from engagement with the pawl 258 as heretofore explained, initiating movement of the magazine from storage position. If the gun is not to be fired automatically upon return of the gun to battery, the arm 326 (Fig. 4) is moved into its other position so that the pin 334 is out of the path of movement of the end 336 of the lever 320, and consequently the shaft 304 must be turned by manipulation of the handle 310 in order to initiate a loading operation. It will further be understood that with the parts in automatic loading positions, as shown in Fig. 4, unless the breechblock is open and the gun cleared of its previously fired shell case the end 336 of the lever 320 will not occupy a high enough position to engage the pin 334 upon return of the gun to battery. This insures that a loading operation will not commence if the gun is not ready to receive a new shell.

Upon movement of the magazine into loading position the lowermost shell is in alinement with the bore of the gun and is rammed into the gun. For thus operating the ramming mechanism there is secured to the breech end of the gun a release arm 338 (Fig. 2) having a rearwardly extending portion and a portion at right angles thereto having slots 340 through which pass screws for adjustably securing the arm to the breech housing. The pin 138 (Fig. 14) has extending laterally therefrom an arm 342 carrying at its outer end a roll 344 arranged to engage the release arm 338 (Fig. 2) upon movement of the magazine into its loading position. Consequently the arm 342 with the pin 138 is moved in a counterclockwise direction as viewed in Fig. 14 thereby to release the slide 96 and permit operation of the rammer.

The stop 262 (Fig. 15) by which rotation of the cam 206 with the gear 204 (Fig. 2) is arrested at the completion of movement of the magazine into loading position, has at its lower end a pin-and-slot connection with a bar 346 extending forwardly along the lower portion of the supporting beam 36. The forward end of the bar 346 has connected to it a spring 348 (Fig. 5) the other end of which is connected to a bracket 350 secured to the supporting beam 36. This spring acts to move the bar 346 forwardly thereby to pivot the stop 262 (Fig. 15) in a clockwise direction out of the path of movement of the pawl 258 movable with the cam 206. With the breechblock in open position to receive a shell from the magazine the bar 346 is held in the position illustrated so that the stop 262 will be engaged by the pawl 258 after the magazine has moved into loading position thereby to arrest movement of the magazine.

The bar 346 extends forwardly of its connection with the spring 348 and is pivoted at 352 (Fig. 5) to the lower end of a lever 354 carried by a shaft 356 extending through the supporting beam 36. Also carried by the shaft 356 is an arm 358 (Figs. 4 and 5) which is arranged to be engaged by the arm 28 when the breechblock is in its open position, the arm 358 being moved thereby into the broken line position of Fig. 4. The bar 346 is in the position shown in Fig. 15 when the arm 358 is held in the broken line position of Fig. 4 with the breechblock open. As soon as a shell has been rammed into the gun the breechblock is automatically closed as will be understood, the arm 28 moving into the full line position of Fig. 4 away from the arm 358 whereupon the spring 348 (Fig. 5) moves the bar 346 forwardly to pivot the stop 262 away from the cam 206. The magazine then returns to the storage position shown in Fig. 2, by the mechanism which has been heretofore described.

In order to prevent unintentional displacement of the stop 262 at the time that the cam 206 completes a half revolution a stop 360 is provided.

This stop is pivoted at 362 to the beam 36 and cooperates with a lug 364 on the stop 262 so that when the stop 360 is in the position illustrated in Fig. 15 the stop 262 is prevented from moving in a clockwise direction. The stop 360 has a downwardly extending slotted portion 366 in which is received a pin 368 carried by the bar 346 so that upon movement of the bar to the left as viewed in Fig. 15 the stop 360 is pivoted downwardly out of register with the lug 364. The pin-and-slot connection between the stop 262 and the bar 346 provides a lost motion connection so that the stop 360 is moved downwardly before motion is imparted to the stop 262. A spring 370 acts to maintain the stop 262 in operative position until the lost motion between it and the bar 346 is taken up. The extent of movement of the stop 262 away from the cam 206 is controlled by a screw 372 with which the upper end of the stop engages after it has moved sufficiently to release the cam 206 for further movement.

As shown in Figs. 1 and 2 the magazine is designed to hold four shells in addition to the one which is in the ramming position on the rammer tray, although it will be understood that the magazine may be designed to hold more shells if desired. Those shells above the one on the rammer tray rest upon one another, the lowermost shell of this group being supported by sprockets 374, 376 carried by a shaft 412 (Figs. 2 and 17). To hold the shells in their proper positions two sets of pivoted stop members 378 are provided, these members being supported by the magazine wall 54 and being urged by springs 380 (Fig. 5) into position to prevent upward movement of the shells while permitting the shells to pass downwardly by them in the magazine loading operation. Also carried by the wall 54 is a series of spring fingers 382 (Fig. 3) arranged to exert a drag upon the heavy projectile ends of the shells as they move downwardly through the magazine by gravity. The purpose of these spring fingers is to prevent more rapid downward movement of the projectile ends of the shells than of the other ends. Endwise movement of the shells carried above the sprockets 374, 376 is prevented by the ends of the magazine. That shell in the ramming position is prevented from moving endwise while the magazine is in its storage position by means of a stop 384 (Fig. 17) pivoted on a bracket 386 extending inwardly from the support 46. The stop is normally held in the position shown in Fig. 17 by a spring 388 but inward movement of the stop against the action of the spring is permitted upon passage of a shell into the ramming position.

Following each ramming operation and during return movement of the magazine from loading position into battery position the sprockets 374 are turned a quarter revolution to feed another shell downwardly into ramming position in the magazine. For this purpose mechanism illustrated in Figs. 19 to 26 is provided. Carried by the wall 54 of the magazine is a bracket 390 having a U-shaped portion in the opposite walls of which are mounted bearings 392 (Fig. 20) for a shaft 394. Journaled on the shaft is a pinion 396 the teeth of which mesh with the teeth of a stationary segmental rack 398 carried by the adjacent support 48. Integral with the pinion 396 is an element 400 of an overload clutch, the other element 402 of which is carried by a sprocket 404 keyed to the shaft 394. The pinion 396 is urged to the left as viewed in Fig. 20 by a spring 406 to hold the clutch element 400 in engagement with clutch element 402. It will be understood that upon movement of the magazine into and out of loading position the pinion 396 traveling along the rack 398 will move the shaft 394 with the sprocket 404 first in one direction and then in the other. The clutch elements 400, 402 provide an overload release permitting relative movement of the pinion 396 and the sprocket 404 in case any of the mechanism driven by the sprocket should jam.

A sprocket chain 408 connects the sprocket 404 with a sprocket 410 which is journaled on the shaft 412 by which feed sprockets 374, 376 are carried. Keyed to the shaft 412 is a ratchet 414 with which cooperate pawls 416 pivoted on pins 418 of the sprocket, the pawls being urged by springs 420 into engagement with the ratchet. The arrangement is such that during movement of the magazine into loading position the sprocket 410 is moved in a counterclockwise direction as viewed in Fig. 23 whereupon the pawls 416 move relatively to the ratchet 414 without imparting any movement thereto. However, upon movement of the magazine in the other direction following loading of the gun the sprocket 410 moves in a clockwise direction as viewed in Fig. 23 and operates through the pawls 416 to turn the ratchet and the shaft 412 causing rotation of the feed sprockets to feed another shell into ramming position.

It is important that the feed sprockets, after they have been turned 90°, be locked against further turning movement under the weight of the shells resting thereon, as otherwise the teeth of the sprocket would engage the shell in ramming position and interfere with its ramming movement. For locking the feed sprockets against such movement, mechanism shown in Figs. 24 to 26 is provided. The sprocket 376 is secured to the shaft 412 by a key 422 (Fig. 25) which fits into a keyway 424 in the hub of the sprocket 376 which keyway is greater in width than that of the key 422. This permits slight relative movement between the sprocket and the drive shaft 412. Secured to the shaft between the sprocket and the ratchet 414 is a retainer 426 for one end of a helical spring 428 which is wrapped around the shaft 412 and has its other end arranged for engagement by a shoulder 430 on the hub of the sprocket 376. This spring has a close fit with a bushing 432 which surrounds it and is keyed in an opening formed in the adjacent portion of the wall of the magazine. When the shaft 412 is turned as heretofore described, to rotate the feed sprockets and carry a shell into ramming position the key 422 (Fig. 25) engages the right side of the keyway 424 and the spring 428 is free to turn within the bushing 432. As soon as motion of the shaft 412 stops, due to return of the magazine to its storage position, the weight of the lowermost shell on the feed sprockets tends to continue their movement and they turn relatively to the shaft 412 until the left side of the keyway 424 engages the key 422. As soon as this movement of the feed sprockets, relatively to the shaft 412, takes place the shoulder 430 acting on the end of the spring 428 tends to unwrap the spring so that it binds against the adjacent surface of the bushing 432 and locks the shaft 412 against turning movement with the sprocket. Consequently the extent of movement of the sprocket is limited to the amount necessary to take up the lost motion between it and the key 422. As soon as another cycle of operations has been completed and the shaft 412 is turned by return movement of the magazine to loading position the spring is wound up sufficiently by reason of its connection to the retaining member 426 to free the shaft for movement with the sprocket, the key 422 in the shaft again assuming the position relatively to the sprocket as shown in Fig. 25. The bushing 432 is provided with teeth 434 cut in its inner surface, the purpose of these teeth being to break any oil film which might form between the periphery of the spring 428 and the adjacent surface of the bushing when the spring is expanded to lock the shaft 412 against turning. Mechanism similar to that which has just been described is associated with the sprocket 374 (Fig. 27) and is identified by similar reference characters.

In order initially to load the magazine the feed sprockets 374, 376 must be manually rotated to permit movement of a shell into ramming position at the bottom of the magazine. For this purpose mechanism illustrated in Figs. 1, 17, 27 and 28 is provided. Secured to the shaft 412 is a clutch member 440 having teeth 442 providing a driving connection between a pinion 444 and the shaft 412. The pinion 444 is held by a spring 446 in driving relationship with the clutch member 440 but permits rotation of the shaft and clutch member 440 with respect to the pinion 444 during automatic operation of the sprockets upon return of the magazine from loading to storage position. A rack 448 (Fig. 28) meshes with the pinion 444 and is guided for vertical movement in a guide member 450 attached to the side wall 54 of the magazine. The upper end of the rack 448 is connected by a link 452 to an arm 454 pivoted at 456 (Fig. 17) to the side wall 54 of the magazine. A spring 458 acts between the arm 454 and a pin carried by the guide member 450 to maintain the arm 454 in the position shown in Fig. 17. Secured to the outer end of the arm is a rope or cable 460 which passes over a pulley 462 at the upper end of the magazine and is secured to a handle 464 (Fig. 1) at the side 52 of the magazine. When the handle 464 is pulled outwardly the cable 460 (Fig. 17) is drawn upwardly to move the arm 454 in a clockwise direction moving the rack 448 upwardly to turn the sprockets 374, 376.

With a shell in ramming position in the lower portion of the magazine the mechanism just described for turning the sprockets manually is rendered inoperative so that the teeth of the sprockets can not be moved downwardly into engagement with the shell in ramming position inasmuch as this would interfere with the ramming movement of the shell. Pivoted in the forward portion of the magazine and extending upwardly through the bottom thereof is a feeler 466 (Figs. 17 and 30) secured to a shaft 468 journaled in a bracket extending downwardly from the magazine. Also secured to the shaft 468 is an arm 470 connected by a rearwardly extending rod 472 with a slide cam 474 (Fig. 29), carried for movement in a slideway 476 secured to the side wall of the magazine. A spring 478 secured to the rearward end of the slide cam 474 and a pin 480 (Fig. 17) carried by the magazine urges the cam slide 474 rearwardly and consequently acts to maintain the feeler 466 in its upper position as shown in Fig. 30. However, when a shell is moved into ramming position in the magazine its nose rests on the feeler 466 and depresses it whereupon the slide cam 474 is moved forwardly against the action of the spring. A stop 482 (Fig. 29) limits the rearward movement of the slide cam under the action of the spring 478.

Carried by a pin 484 on the side wall 54 of the magazine is a bell crank lever 486 having a downwardly extending arm 488 carrying a cam roll 490 which is maintained in engagement with the adjacent edge face of the slide cam 474 by a torsion spring 492. The bell crank lever has an upwardly extending arm 494 the end of which is engaged by a pawl 496 carried by a pin 498 in the guide member 450. This pawl is normally urged downwardly by a torsion spring 500 but when it is moved into the position shown in Fig. 28 it cooperates with a ratchet 502 formed on the clutch member 440 to prevent movement of the shaft 412 in a clockwise direction. With a shell in ramming position in the magazine the cam roll 490 engages a widened portion of the slide cam 474 so that the bell crank lever 486 is held in the position shown in Fig. 28 with the pawl 496 in locking relationship to the ratchet 502. However, with no shell in loading position the slide cam 474 is moved rearwardly by the spring 478 whereupon the bell crank lever 486 is moved in a counterclockwise direction and pawl 496 is moved downwardly out of engagement with the ratchet 502. Consequently, in so far as this mechanism is concerned, the sprockets 374, 376 are free to be turned manually. However, other conditions may exist which would make it undesirable to operate the feed sprockets and accordingly means are provided to prevent rotation of the sprockets under such circumstances as will be explained. As heretofore explained, the rammer tray 68 (Fig. 2) is pivoted at 70 and is arranged to be opened to permit removal of a shell from the magazine if desired. With this tray in open position, as indicated in broken lines in Fig. 2, it is undesirable that the sprockets 374, 376 be operated inasmuch as a shell might become jammed in the bottom of the magazine. For locking the tray 68 in operative position, as shown in Fig. 2, it is provided with inwardly and upwardly extending lugs 504 which register with openings in a plate 506 carried by the wall 52 of the magazine. A slidable plate 508 having openings 510 (Fig. 5) therein, is arranged to be moved from the broken line position shown in Fig. 5 to the right so that the openings 510 register with the lugs 504. When the plate is thus moved the rammer tray may be moved outwardly to permit emptying the magazine of shells. For thus moving the plate 508 a handle 512 is carried by a shaft 514 in the side wall 54 of the magazine. Secured to and extending downwardly from the shaft 514 is an arm 516 having a pin-and-slot connection 518 with the plate 508. Upon movement of the handle 512 in a counterclockwise direction the plate 508 is moved to the right to permit opening the rammer tray 68.

The rammer tray has a forwardly projecting bracket 520 (Fig. 8) arranged with the tray in closed position to engage the end of a spring pressed plunger 522 slidable transversely of the magazine and carried by the front end wall thereof. The plunger is urged toward the left as viewed in Fig. 8 by a spring 524 and the right end of the plunger is connected by a pin-and-slot connection 526 (Fig. 18) to a lever 528 pivoted at 530 in a bracket carried by the wall 54 of the magazine. The opposite end of the lever 528 is arranged upon clockwise movement of the lever by the plunger 522 when the tray is open to overlie a projection 532 extending inwardly from the arm 454. Consequently with the rammer tray open lever 529 prevents upward movement of the arm 454 so that manual indexing of the sprockets 374, 376 is prevented. Upon closure of the rammer tray, however, the lever 529 moves into the position shown in Fig. 18 and does not interfere with movement of the arm 454. To empty the magazine of its shells the rammer tray is opened to empty the shell thereon, is then closed, and another shell is fed downwardly thereinto. This procedure is repeated until the magazine is entirely emptied of its shells.

In the event that there is no shell in ramming position in the lower portion of the magazine, movement of the magazine from its storage position to loading position is prevented, inasmuch as the energy stored in the magazine-operating spring should be conserved until it is possible, upon movement of the magazine, to load a shell into the gun for subsequent firing and incidentally for restoring energy in the spring. With no shell in ramming position in the magazine, the feeler 466 occupies the position shown in Fig. 30 as heretofore explained. Carried by the shaft 468 to which the feeler is secured is an arm 534 carrying a friction disk 536 which cooperates with a similar disk 538 carried by the arm 470. A spring 540 forces the arm 534 with its friction disk 536 toward the arm 470 so that upon upward movement of the feeler 466 the arm 534 will move with it. The extent of movement of the arm 534 is less than that of the feeler 466, however, so that the feeler can continue moving after the arm 534 has engaged a stop 542 carried by the wall 54 of the magazine. A second stop 544 limits the downward movement of the arm 534. When the arm moves upwardly against the stop 542 it engages a lateral projection 546 of a bell crank lever 548 pivoted at 550 on a bracket 552 extending laterally from the supporting beam 36. If the magazine returns to storage position with no shell in the rammer tray the bell crank lever is moved by the arm 534 in a counterclockwise direction as viewed in Fig. 33. Connected to an arm 554 of the bell crank lever by a link 556 is a second bell crank lever 558 (Fig. 30) which is in turn connected by a rod 560 to the upper end of the arm 286 (Fig. 17). Operation of lever 554 by the arm 534 due to the absence of a shell in the loading position in the magazine causes the arm 286 to move in a clockwise direction and through the link 288 (Fig. 15) lifts the adjacent end of the rod 272 so that the pin 274 is in the horizontal portion of the slot 276 whereby subsequent movement of the rod 272, as heretofore described, will not initiate another cycle of operation of the magazine.

Secured to a shaft 562 (Figs. 31, 33) journaled in a bracket 563 secured to the supporting beam 36, is an arm 564 having an open ended slot in which is received a pin 566 carried by the arm 554 of the lever 548. The shaft 562 also has secured thereto an arm 568 (Figs. 30, 31 and 32) the outer end of which is arranged to be held in an elevated position by a latch 570 when the feeler 466 is in an elevated position. This latch forms one arm of a bell crank lever pivoted at 572 on the bracket 563 the other arm of the lever being urged upwardly into engagement with an adjustable stop screw 574 by a spring-actuated plunger 576. The latch 570 has formed therein a recess 578 against the lower shoulder of which the outer end of the arm 568 rests with the parts in the positions shown in Fig. 30. During movement of the feeler 466 downwardly by engagement of a shell therewith the arm 534 moves out of engagement with the projection 546 of the lever 548 but the lever 548 is held in the position shown until the arm 568 is released by movement of the latch 570 against the action of the spring-pressed plunger 576. This takes place when the shell moves into ramming position in the magazine by the engagement of the outer end of the feeler 466 with a curved upper surface 580 of the latch 570 causing movement of the latch in a clockwise direction and releasing the parts whereupon a spring 582 (Fig. 17) moves the rod 560 to the left lowering the adjacent end of the rod 272 so that it lies in the vertical portion of the slot 276 (Fig. 15). Consequently, movement of the rod 272 to the left actuates the stop 252 to free the pawl 258 and permits movement of the magazine into ramming position.

Carried by the rammer tray is a plate 584 (Figs. 19, 21 and 31) engageable upon opening the tray with an adjustable screw 586 carried by the outer end of an arm 588 also secured to the shaft 562. Consequently when the rammer tray is opened the shaft 562 is moved in a clockwise direction as viewed in Fig. 33 causing movement of the lever 544 in a counterclockwise direction and through the mechanism heretofore described, preventing operation of the magazine.

The gun is arranged to be fired automatically upon return of the magazine into its storage position. Secured to the shaft 196 (Fig. 2) carrying the bevel gear 202 is a switch-actuating arm 590 (Fig. 17) which operates a switch 592 upon completion of one revolution of the bevel gear 202 at which time the magazine should have moved through its cycle carrying a shell into ramming position and then returning to its storage position. This switch closes a circuit to a firing motor 594 (Fig. 1) which is shown as being carried by supports 596 depending from the supporting framework within the airplane. On the shaft of the motor 594 is an eccentric 598 which oscillates an arm 600, one end of which is pivoted at 602 to the motor housing and the other end of which is connected by a link 604 to a rod 606 slidable in a housing 608 (Fig. 4) mounted on the gun carriage. The rearward end of the rod 606 carries a block 610 to which is pivoted at 612 an arm 614 the lower end of which slides in the rearward end of the housing 608 and operates upon rearward movement to actuate a firing lever 616. When this lever is moved rearwardly it operates through mechanism well known in the art to fire the gun.

In the event that the motor 594 (Fig. 1) be operated prior to movement of the magazine into its storage position it is important that the gun not be fired as otherwise damage might occur by reason of the gun in its recoil movement striking the magazine or mechanisms carried thereby. To the upper end of the arm 614 is pivoted a rod 618 the rearward end of which is slidable in a bracket 620 carried by the airplane and inwardly of the bracket 620 in the path of movement of the rod 618 is a bar 622 movable in a slideway 624 pivoted at 626 to the bracket 620. The upper end of the bar (Fig. 2) is secured to the magazine and slides in the slideway 624 during oscillation of the magazine from storage position to ramming position and back to storage position. If the magazine is in its storage position so that the gun may be fired without damaging the magazine an aperture 628 of the bar 622 is in alinement with the rod 618 so as not to impede rearward movement of the rod during actuation of the firing motor 594. If, however, the magazine is not properly returned to its storage position the rearward end of the rod 618 strikes the bar 622 and causes the arm 614 to pivot in a counterclockwise direction with respect to the block 610. When this happens the lower end of the arm tilts upwardly and clears the firing lever 616 so that firing of the gun does not take place. A spring 630, acting between the arm 614 and the block 610 normally maintains the arm in its operative position as illustrated in Fig. 4.

Having thus described the invention what we claim as new and desire to secure by Letters Patent of the United States is:

1. In combination, a gun, a shell magazine mounted for bodily movement relatively to the gun into and out of gun-loading position, and means carried by said magazine for ramming a shell into the gun when the magazine is in gun-loading position.

2. In combination, a gun, a shell magazine mounted for bodily movement relatively to the gun into and out of gun-loading position, means energized during counter-recoil movement of the gun for thus moving the magazine, and means carried by the magazine for ramming a shell into the gun when the magazine is in gun-loading position.

3. In combination, a gun, a shell magazine mounted for swinging movement to carry a shell supported thereby into alinement with the bore of the gun and then to swing reversely out of the path of movement of the gun in recoil, and means for ramming a shell from the magazine into the gun when the shell is in alinement with the bore of the gun, said means being carried by said magazine.

4. In combination, a gun, a shell magazine mounted for swinging movement to carry a shell supported thereby into alinement with the bore of the gun and then to swing reversely out of the path of movement of the gun in recoil, means energized during counter-recoil movement of the gun for thus moving the magazine, and means carried by the magazine for ramming a shell from the magazine into the gun when the shell is in alinement with the bore of the gun.

5. In combination, a gun, a shell magazine mounted for swinging movement to carry a shell supported thereby into alinement with the bore of the gun and then to swing reversely out of the path of movement of the gun in recoil, means energized during counter-recoil movement of the gun for thus moving the magazine, means carried by the magazine for ramming a shell from the magazine into the gun when the shell is in alinement with the bore of the gun, and means energized by the gun in its counter-recoil movement for operating said ramming means.

6. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, means for thus moving the magazine, and means operated in response to movement of the magazine into loading position for ramming the lowermost shell into the gun.

7. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, means for thus moving the magazine, means operated in response to movement of the magazine into loading position for ramming the lowermost shell into the gun, and means operated in response to movement of the magazine to storage position for feeding the shells in the magazine downwardly to carry another shell into the lowermost portion of the magazine.

8. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, means for thus moving the magazine, means operated in response to movement of the magazine into loading position for ramming the lowermost shell into the gun, and means preventing movement of the magazine into loading position if no shell is in the lowermost portion thereof.

9. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, means for thus moving the magazine, means operated in response to movement of the magazine into loading position for ramming the lowermost shell into the gun, and means preventing movement of the magazine until the gun has been cleared of the case of a previously loaded shell.

10. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, means for thus moving the magazine, a rammer carried by the magazine, and means operative in response to movement of the magazine into loading position for operating the rammer to load the shell in the gun.

11. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, a spring, mechanism operated by the spring for thus moving the magazine, means operated by the counter-recoil movement of the gun for storing energy in said spring, and means operative in response to movement of the magazine into loading position for ramming the lowermost shell into the gun.

12. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, a spring, mechanism operated by the spring for thus moving the magazine, means operated by the counter-recoil movement of the gun for storing energy in said spring, means for preventing operation of said mechanism by said spring until the gun returns to battery with the breech clear for the reception of a shell, and means operative in response to movement of the magazine into loading position for ramming the lowermost shell into the gun.

13. In combination, a gun, a shell magazine arranged to hold a plurality of shells in superposed relation, said magazine being mounted for swinging movement about an axis above the gun into loading position to carry the shell in the lowermost portion of the magazine into alinement with the bore of the gun and for movement into storage position out of the path of movement of the gun in recoil, a spring, mechanism operated by the spring for thus moving the magazine, means operated by the counter-recoil movement of the gun for storing energy in said spring, means for preventing operation of said mechanism by said spring if no shell is in the lowermost portion of the magazine, and means operative in response to movement of the magazine into loading position for ramming the lowermost shell into the gun.

14. In combination, a gun, a magazine, means mounting said magazine for oscillation about an axis above and to one side of the longitudinal axis of the gun, said magazine having a rammer tray in the lower portion thereof, sprockets above said tray for supporting a plurality of shells in horizontal superposed positions and operative to feed shells one at a time onto said tray, a rammer associated with said tray for moving a shell endwise from said magazine into said gun with the magazine in one extreme position, means for moving said magazine into said one extreme position and into its other extreme position in which it is out of the path of movement of the gun in recoil, means for operating said rammer with the magazine in said one extreme position, and means for operating said sprockets during movement of the magazine to said other extreme position.

15. In combination, a gun, a magazine, means mounting said magazine for oscillation about an axis above and to one side of the longitudinal axis of the gun, said magazine having a rammer tray in the lower portion thereof, sprockets above said tray for supporting a plurality of shells in horizontal superposed positions and operative to feed shells one at a time onto said tray, a rummer associated with said tray for moving a shell endwise from said magazine into said gun with the magazine in one extreme position, spring means energized by the gun in its counter-recoil movement for moving the magazine, spring means energized by the gun in its counter-recoil movement for operating said rammer with the magazine in said one extreme position, and means operated in response to movement of the magazine to its other extreme position for operating said sprockets.

16. In combination, a gun, a magazine, means mounting said magazine for oscillation about an axis above and to one side of the longitudinal axis of the gun, said magazine having a rammer tray in the lower portion thereof, sprockets above said tray for supporting a plurality of shells in horizontal superposed positions and operative to feed shells one at a time onto said tray, a rammer associated with said tray for moving a shell endwise from said magazine into said gun with the magazine in one extreme position, spring means energized by the gun in its counter-recoil movement for moving the magazine, spring means energized by the gun in its counter-recoil movement for operating said rammer with the magazine in said one extreme position, means operated in response to movement of the magazine to its other extreme position for operating said sprockets, and means for preventing operation of said first-named spring means until a shell is in the rammer tray.

17. In combination, a gun, a magazine, means mounting said magazine for oscillation about an axis above and to one side of the longitudinal axis of the gun, said magazine having a rammer tray in the lower portion thereof, sprockets above said tray for supporting a plurality of shells in horizontal superposed positions and operative to feed shells one at a time onto said tray, a rammer associated with said tray for moving a shell endwise from said magazine into said gun with the magazine in one extreme position, spring means energized by the gun in its counter-recoil movement for moving the magazine, spring means energized by the gun in its counter-recoil movement for operating said rammer with the magazine in said one extreme position, means operated in response to movement of the magazine to its other extreme position for operating said sprockets, and means for preventing operation of said first-named spring means until the breech is clear for the reception of a shell.

18. In combination, a gun, a magazine, means mounting said magazine for oscillation about an axis above and to one side of the longitudinal axis of the gun, said magazine having a rammer tray in the lower portion thereof, sprockets above said tray for supporting a plurality of shells in horizontal superposed positions and operative to feed shells one at a time onto said tray, a rammer associated with said tray for moving a shell endwise from said magazine into said gun with the magazine in one extreme position, spring means enregized by the gun in its counter-recoil movement for moving the magazine, spring means energized by the gun in its counter-recoil movement for operating said rammer with the magazine in said one extreme position, means operated in response to movement of the magazine to its other extreme position for operating said sprockets, and means for preventing operation of said first-named spring means until a shell is in the rammer tray and the breech is clear for the reception of a shell.

JOHN E. WALSH.
CHESTER W. GREENE.

REFERENCES CITED

The following references are of record in the file of this patent:

UNITED STATES PATENTS

| Number | Name | Date |
|---|---|---|
| 2,122,423 | Joyce | July 5, 1938 |

FOREIGN PATENTS

| Number | Country | Date |
|---|---|---|
| 125,442 | Great Britain | Apr. 24, 1919 |